Aug. 3, 1926.

G. D. PARKER

1,594,553

MACHINE FOR MAKING BOXES OF DIFFERENT SIZES

Filed Sept. 7, 1920          6 Sheets-Sheet 1

INVENTOR.
George D. Parker
BY
Acker & Tolbin
his ATTORNEYS.

Aug. 3, 1926.

G. D. PARKER 1,594,553

MACHINE FOR MAKING BOXES OF DIFFERENT SIZES

Filed Sept. 7, 1920    6 Sheets-Sheet 3

INVENTOR.
BY George D. Parker
ATTORNEYS.

Aug. 3, 1926.

G. D. PARKER 1,594,553

MACHINE FOR MAKING BOXES OF DIFFERENT SIZES

Filed Sept. 7, 1920      6 Sheets-Sheet 4

Aug. 3, 1926.

G. D. PARKER 1,594,553

MACHINE FOR MAKING BOXES OF DIFFERENT SIZES

Filed Sept. 7, 1920 6 Sheets-Sheet 5

INVENTOR.
George D. Parker
BY Acker & Totten
his ATTORNEYS.

Aug. 3, 1926.

G. D. PARKER

1,594,553

MACHINE FOR MAKING BOXES OF DIFFERENT SIZES

Filed Sept. 7, 1920    6 Sheets-Sheet 6

INVENTOR.
George D. Parker
BY
ATTORNEYS.

Patented Aug. 3, 1926.

1,594,553

UNITED STATES PATENT OFFICE.

GEORGE D. PARKER, OF RIVERSIDE, CALIFORNIA.

MACHINE FOR MAKING BOXES OF DIFFERENT SIZES.

Application filed September 7, 1920. Serial No. 408,508

The present invention relates to a machine for assembling and nailing boxes from previously formed shooks.

The object of the invention is to provide a machine of the class described which is capable of adjustment to enable it to assemble and nail boxes of various sizes. This results in a great saving in expense, for a manufacturer or shipper requiring boxes of more than one size need install only one adjustable machine for making all sizes of boxes, instead of being required to install a separate machine for each size of box, as is necessary with the usual types of box-making machines now in use.

My invention will be hereinafter described, and is herewith illustrated in its preferred form, but it is to be understood that changes may be made in the form and construction of the machine, within the scope of the claims hereto appended, without in any way affecting the principles of the invention or departing from the spirit thereof.

In order to fully comprehend the invention, reference should be had to the accompanying sheets of drawings, wherein—

Figure 1:
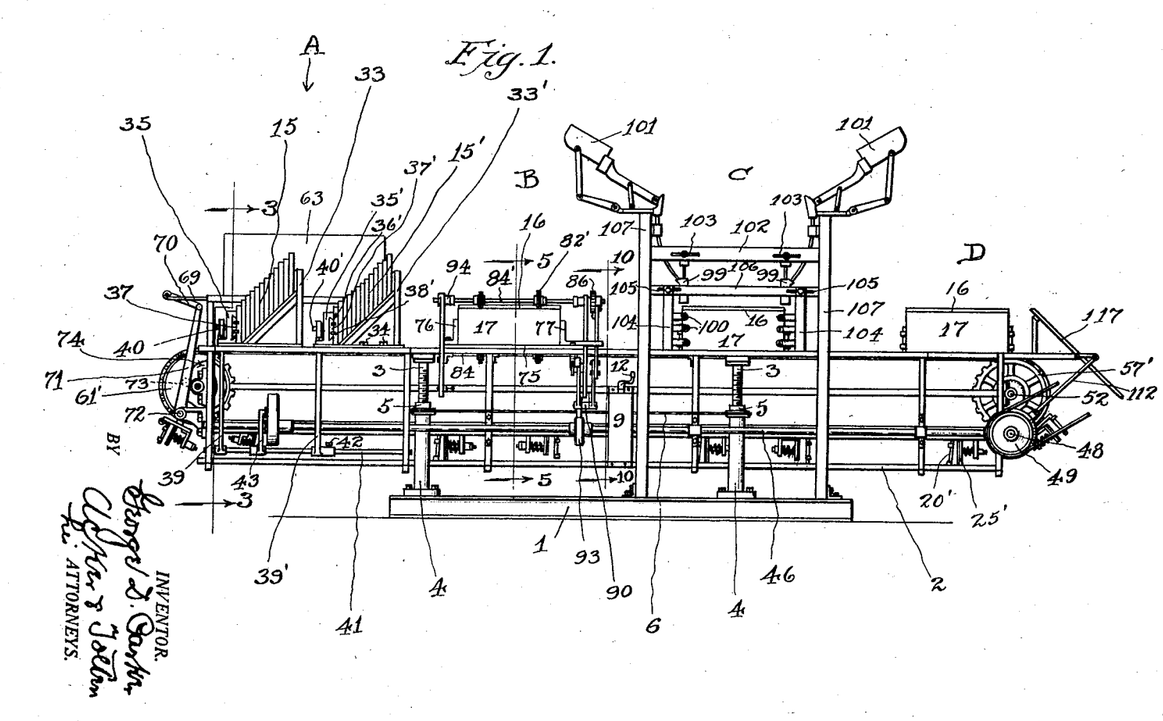
Fig. 1 is a side elevation of a box-assembling and nailing machine embodying the principles of my invention.
Figure 2:
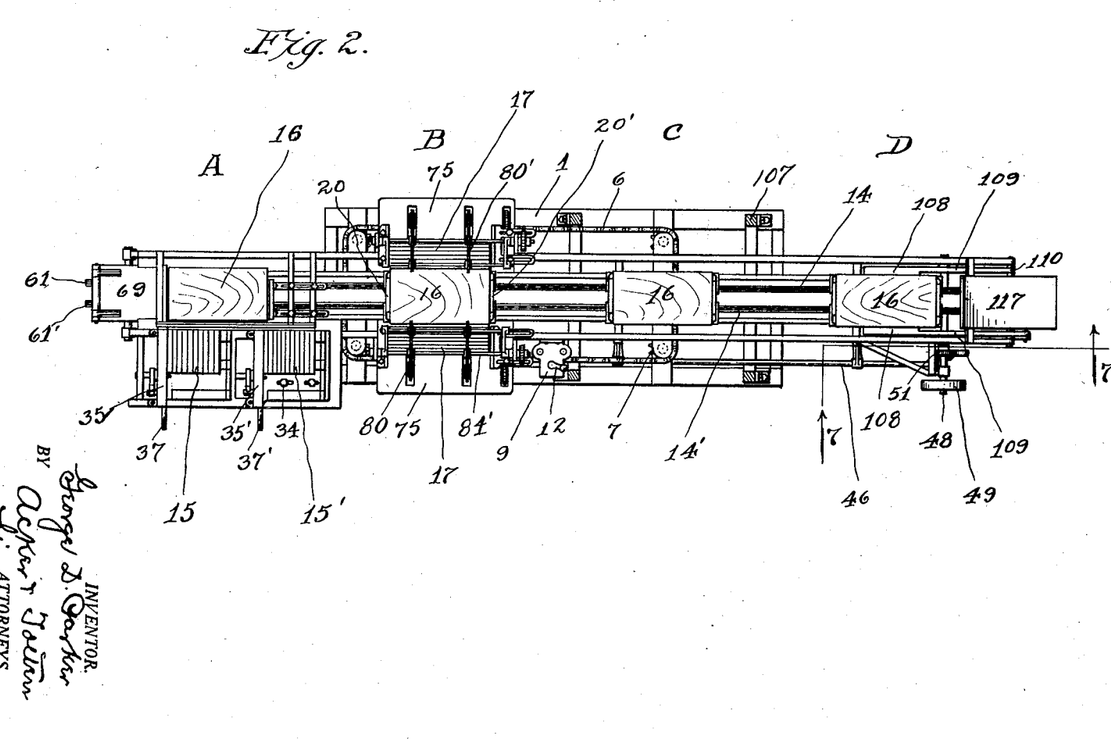
Fig. 2 is a plan view of the same, the nailing mechanism being omitted for the sake of clearness.
Figures 10, 11, 12:
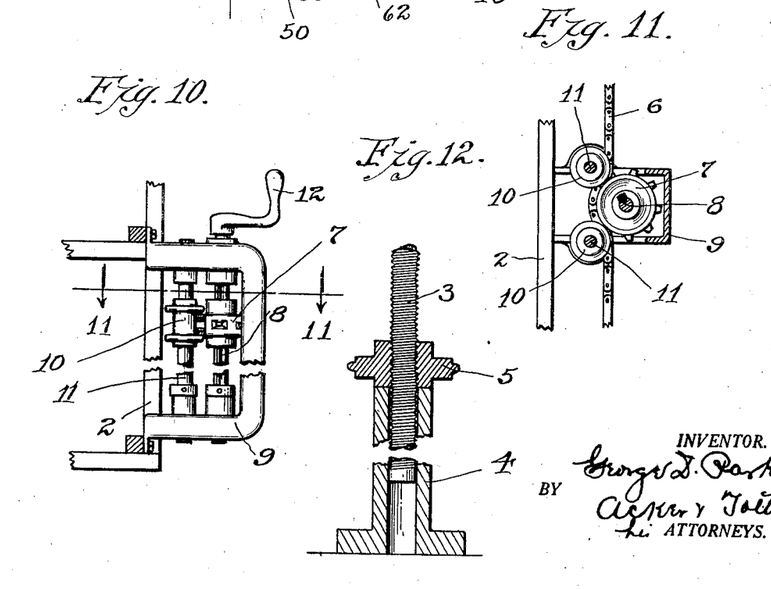
Fig. 10 is a fragmental transverse section, enlarged, of the main frame adjusting means, taken in the direction of the arrows on the line 10—10 of Fig. 1.
Fig. 11 is a sectional plan view of the same, taken in the direction of the arrows on the line 11—11 of Fig. 10.
Fig. 12 is a fragmental section, enlarged, of one of the adjustable frame supports.

In the drawings, and referring now more particularly to Figs. 1 and 2 thereof, the reference numeral 1 designates a stationary base, upon which the entire machine is supported. 2 is the main frame of the machine, comprising longitudinal, transverse, and vertical members suitably arranged to support the various operating parts. The frame 2 is vertically adjustable with respect to the base 1, for a purpose to be hereinafter set forth. This adjustment is accomplished by mounting the frame 2 on four vertical threaded columns 3, whose lower end portions extend into and are vertically movable within hollow posts 4, Figs. 1 and 12 of the drawings, secured to and rising from the base 1. Resting upon each post 4 is a nut 5, interiorly threaded to engage the column 3, and having sprocket teeth formed upon its outer periphery. An endless chain 6, Figs. 1 and 2, engages the sprocket teeth of all four nuts 5, and also engages the teeth of a sprocket 7, Figs. 10 and 11, which is slidably mounted upon a splined vertical shaft 8 rotatably mounted in a bracket 9 secured to the frame 2. Idler rollers 10, slidably and rotatably mounted upon vertical spindles 11, hold the chain 6 in engagement with the sprocket 7. The shaft 8 is provided with a crank 12, Figs. 1, 2 and 10, by means of which it may be operated. Thus by turning the crank 12, the four nuts 5 are simultaneously rotated, to raise or lower the entire frame 2. The sprocket 7 and the idlers 10, being slidably mounted upon their respective shafts, as shown in Figs. 10 and 11, permit the supporting bracket 9 to move up and down with the frame 2 without distorting the chain 6 horizontally.

The frame 2 supports a longitudinally disposed track 13, Figs. 1 and 2 of the drawings, extending the entire length of said frame, and upon which the boxes are moved, from end to end, by carriers impelled by a pair of spaced parallel conveyer chains 14 and 14'. Said conveyer chains are moved intermittently, carrying the boxes through successive stations, at each of which they are allowed to come to rest while certain operations are performed. Thus at the station indicated by the letter A in Figs. 1 and 2, the end shooks 15 and 15' and the bottom shook 16 of a box are placed in position on the carriers, at B the side shooks 17 are assembled in proper relation to said ends and bottom, at C the assembled box is nailed, and at D the completed box is discharged from the machine.

The carriers for holding the boxes during the above mentioned operations are arranged in pairs, each pair being adapted to support the two end shooks 15 and 15' of a box. There are a plurality of such pairs of carriers, similar in construction, and so positioned relative to the conveyer chains 14 and 14' that while said chains are at rest, there is one pair of carriers at each of the above mentioned stations. Thus there are a plurality of boxes being acted upon simultaneously, and all are advanced one station at each step movement of said chains.

Figure 5:
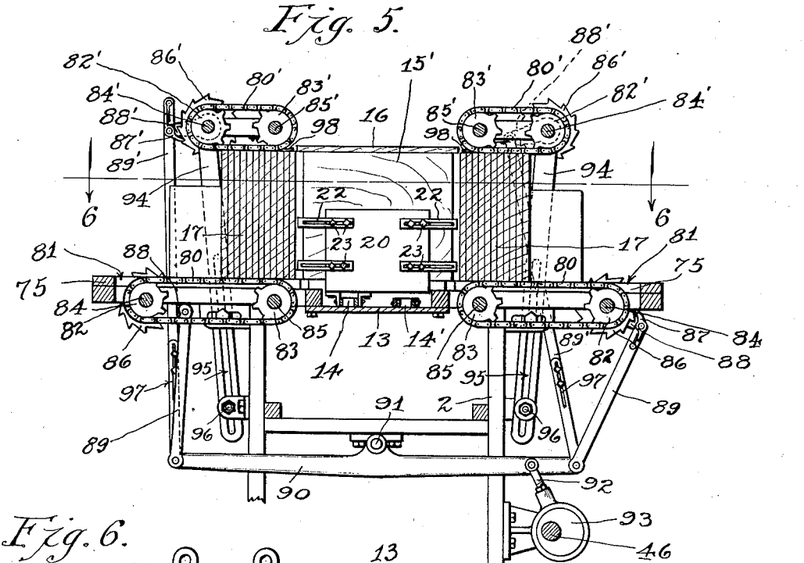
Fig. 5 is a transverse section taken in the direction of the arrows on the line 5—5 of Fig. 1, and enlarged, showing the side holding and feeding mechanism.
Figure 6:
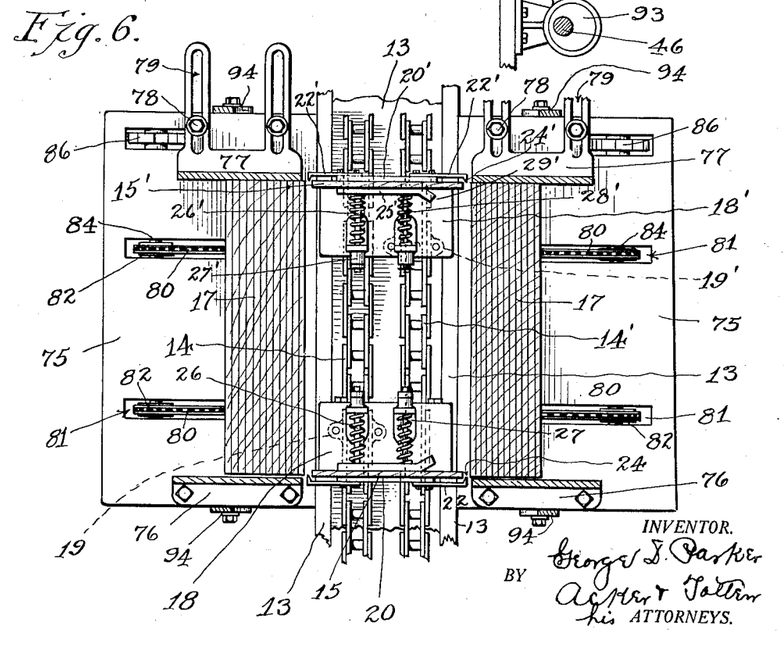
Fig. 6 is a fragmental sectional plan view of the same, taken in the direction of the arrows on the line 6—6 of Fig. 5.
Figure 7:
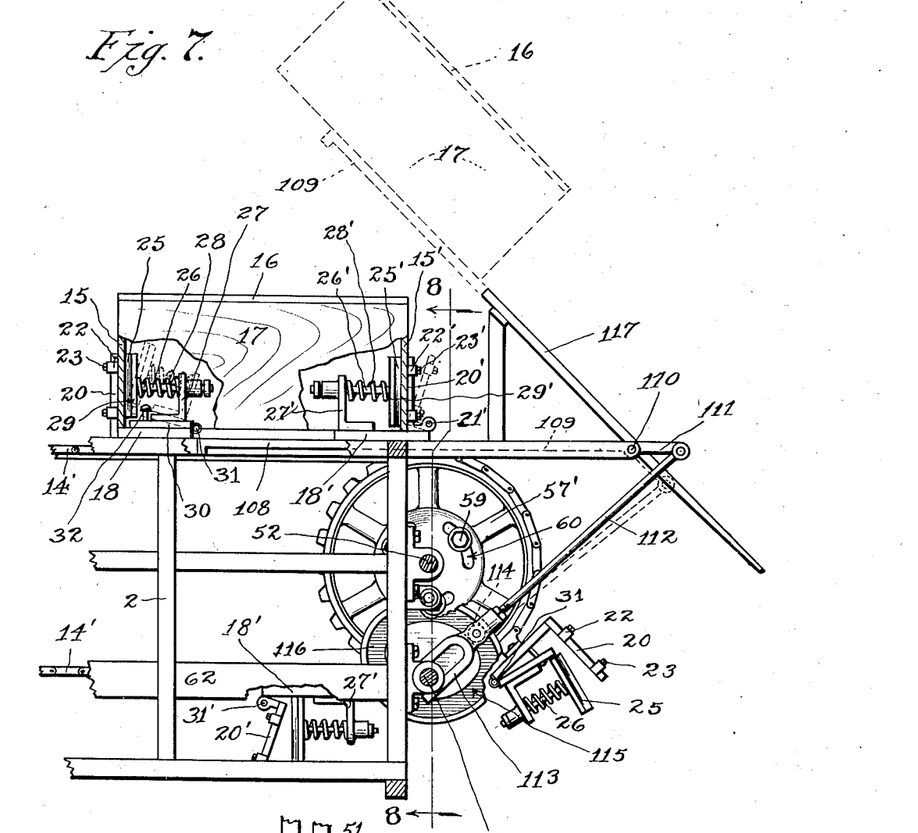
Fig. 7 is a partly broken longitudinal section, enlarged, of the discharge mechanism, taken in the direction of the arrows on the line 7—7 of Fig. 2.

One pair of said carriers is illustrated in detail in Figs. 3, 5, 6, 7 and 8 of the drawings, and comprises a pair of spaced horizontal plates 18 and 18', Figs. 6 and 7, adapted to slide upon the track 13, and secured respectively to the chains 14 and 14' by bolted connections 19 and 19', Figs. 5 and 6. The forward horizontal carrier plate 18' carries a vertical plate 20', Figs. 6, 7 and 8, secured by a horizontal hinge connection 21', Figs. 7 and 8, which enables it to swing forwardly, as shown in dotted lines in the upper portion of Fig. 7, and in full lines in the lower portion thereof, for a purpose to be set forth hereinafter. Said vertical plate 20' carries slotted laterally projecting spring fingers 22', Figs. 6, 7, and 8, preferably two on each side, adjustably secured to said vertical plate 20' by bolts or screws 23', and having their ends turned rearwardly, to form prongs, as shown at 24' in Fig. 6. Immediately behind said vertical plate 20' is a second vertical plate 25', Figs. 6 and 7, carried upon horizontal bars 26' slidably mounted in brackets 27' secured to and rising from the horizontal plate 18'. Springs 28' press said inner plate 25' toward the outer plate 20', to clamp the box end 15' therebetween. One vertical edge of the inner plate 25' is flared rearwardly, as shown at 29' in Figs. 6 and 7, to enable the box end 15' to enter between it and the outer plate 20'.

The rear horizontal plate 18, Fig. 7, carries a vertical plate 20, Figs. 5, 6 and 7, similar to the forward vertical plate 20', except that said plate 20 is rigidly connected with the horizontal plate 18. Said vertical plate 20 carries slotted laterally projecting spring fingers 22, adjustably secured by screws 23, and formed with forwardly turned ends or prongs as shown at 24 in Fig. 6.

Immediately forward of said vertical plate 20 is a second and inner vertical plate 25, Figs. 6 and 7, carried upon horizontal bars 26 slidably mounted in brackets 27. Springs 28 press said inner plate 25 toward the outer plate 20, to clamp the box end 15 therebetween, and one vertical edge of said inner plate 25 is flared forwardly, as shown at 29, to enable the box end 15 to enter between it and the outer plate 20. The brackets 27 which support the yieldably mounted plate 25 are not mounted directly upon the horizontal plate 18, as in the case of the brackets 27' of the forward carrier, but are carried on a member 30, Fig. 7, which is connected with the carrier plate 18 by horizontal hinge connections 31, so that said inner plate 25 may swing forwardly away from the outer plate 20, as shown in dotted lines in the upper portion of Fig. 7, and in full lines in the lower portion thereof, for a purpose to be hereinafter set forth. A stop 32 is provided for limiting such swinging movement.

Figure 3:
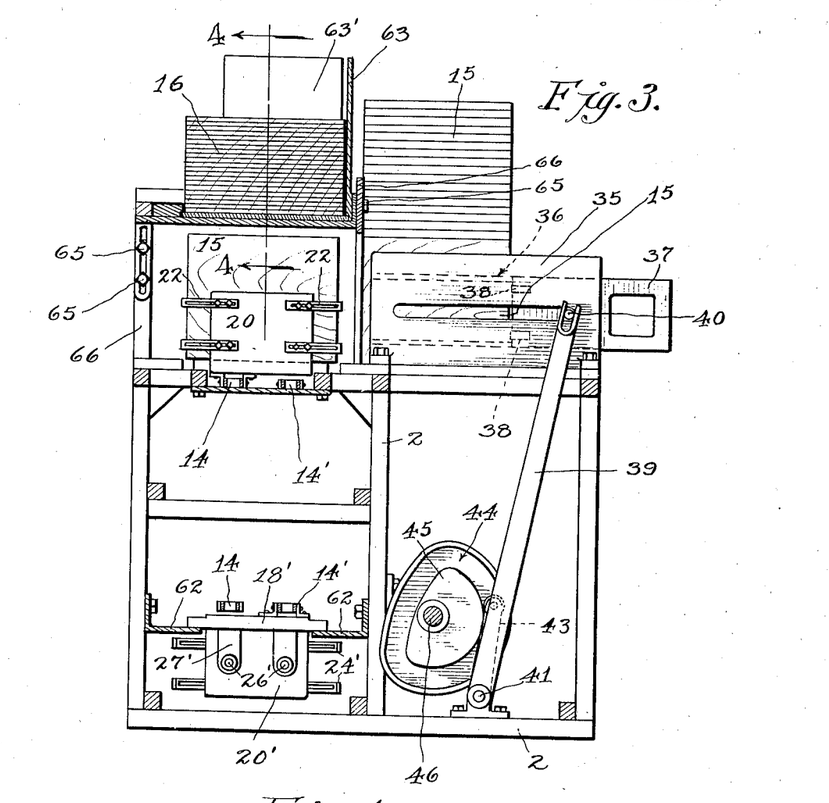
Fig. 3 is a transverse section taken in the direction of the arrows on the line 3—3 of Fig. 1 and enlarged, showing the end feeding mechanism.

The box ends 15 and 15' are initially held in stacks in inclined holders 33 and 33' respectively, Figs. 1, 2 and 3, of the drawings, said holders being positioned upon the frame 2 to one side of the carrier track 13, at the position A of Figs. 1 and 2. The holder 33 is permanently secured to the frame 2, but the holder 33' is adjustable longitudinally of said frame, being secured thereto by bolts 34 passing through slots formed in the base of said holder. At the rear of said holders 33 and 33' are vertical plates 35 and 35' respectively, Figs. 1, 2 and 3, against which the lowermost box ends 15 and 15' of the stacks rest. Said plates are formed with horizontal guide ways 36 and 36', Figs. 1 and 3, on their forward or inner faces, within which are horizontally reciprocable feed slides 37 and 37' carrying inwardly projecting fingers 38 and 38' respectively, adapted to engage the outer edges of said lowermost ends and move the same laterally onto the positioned carriers, upon the inward movement of said feed slides.

The feed slides 37 and 37' are reciprocated by arms 39 and 39', Figs. 1 and 3 of the drawings, whose upper ends are bifurcated to engage pins 40 and 40' respectively, projecting from said feed slides through slots formed in the stationary holder end plates 35 and 35'. Said arms are secured to a horizontal shaft 41, the arm 39' being mounted thereon for horizontal adjustment, as by means of a set screw 42, Fig. 1, to enable it to be moved longitudinally of the machine with the adjustable holder 33. The shaft 41 is oscillated, to cause reciprocating movement of the feed slides 37 and 37', by a lever arm 43, Figs. 1 and 3, carrying at its end a roller adapted to follow a groove 44, Fig. 3, formed in a cam member 45, Figs. 1 and 3, secured to a longitudinal shaft 46 journalled in the frame 2 and extending the entire length thereof.

Figure 8:
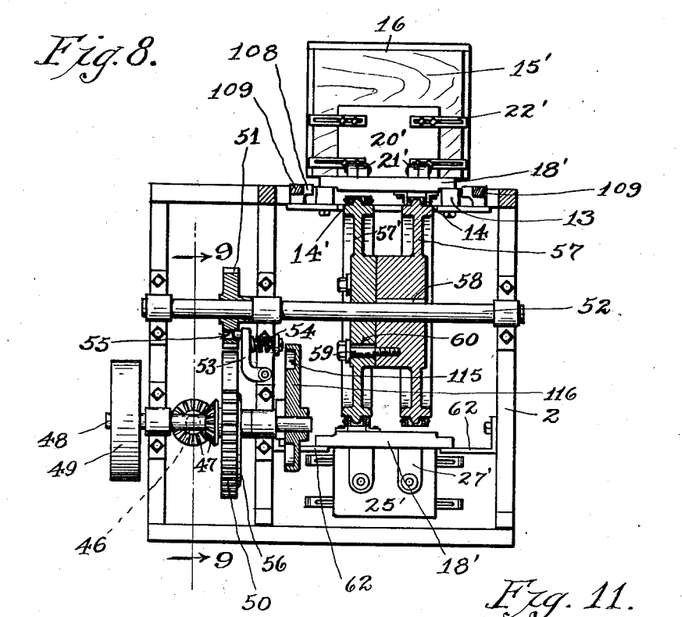
Fig. 8 is a transverse section of the same, taken in the direction of the arrows on the line 8—8 of Fig. 7.
Figure 9:
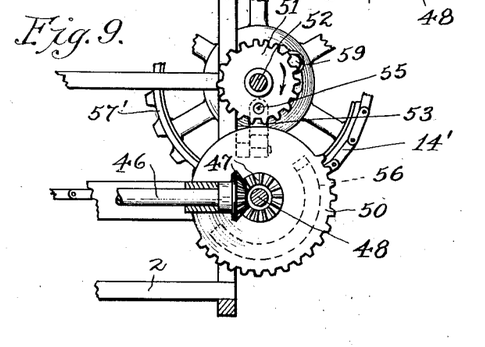
Fig. 9 is a fragmental section of the intermittent drive mechanism taken in the direction of the arrows on the line 9—9 of Fig. 8.

The longitudinal shaft 46 is continuously rotated by a pair of bevel gears 47, Figs. 2, 8 and 9, from a transverse drive shaft 48, Figs. 1, 2, 7, 8 and 9, suitably journalled at the forward end of the frame 2. Said drive shaft is provided with a pulley 49, Figs. 1, 2 and 8, for receiving power from any desired source not shown in the drawings. The drive shaft 48 also carries a mutilated gear 50, Figs. 8 and 9, which is adapted to mesh intermittently with a complete gear 51 fixed upon a transverse shaft 52 positioned above said drive shaft. In order to lock the shaft 52 against rotation while the inactive portion of the mutilated gear 50 is passing the complete gear 51, there is provided a latch 53, Fig. 8, normally held by a spring 54 in engagement with a socket 55 in said complete gear 51, and adapted to be withdrawn from said socket by a cam 56 formed on the adjacent face of said mutilated gear. Said cam is so positioned that the latch 53 is withdrawn from its socket 55 at the instant that the mutilated gear 50 begins to engage the complete gear 51, so that the shaft 52 is free to rotate while said gears are in mesh, but is held stationary while said gears are out of mesh. The shaft 52 is thus driven with an intermittent motion, making one complete revolution during each period of movement.

The shaft 52 carries sprockets 57 and 57', Figs. 1, 7 and 8, over which the carrier chains 14 and 14' travel at their forward ends, and which impart motion to said chains. The sprocket 57, Fig. 8, which drives the chain 14, is permanently fixed upon said shaft 52, as by means of a key 58. The sprocket 57', carrying the chain 14', is adjustably secured to the hub of the sprocket 57 by bolts or screws 59, Figs. 7 and 8, which pass through arcuate slots 60 in the hub of the sprocket 57'. The chain 14' is thus linearly adjustable with respect to the chain 14, so that the forward box end carriers, which are associated with the chain 14', by the connections 19', may be moved closer to or farther away from the rear carriers, associated with the chain 14 by the connections 19, to accommodate boxes of various sizes. The rear ends of the chains 14 and 14' pass over idler sprockets 61 and 61', Figs. 1 and 2, suitably journalled upon the frame 2, and the lower, or return runs of said chains are supported by the plates 18 and 18' of the inverted carriers, which travel upon spaced rails 62, Figs. 1, 3 and 8.

Figure 4:
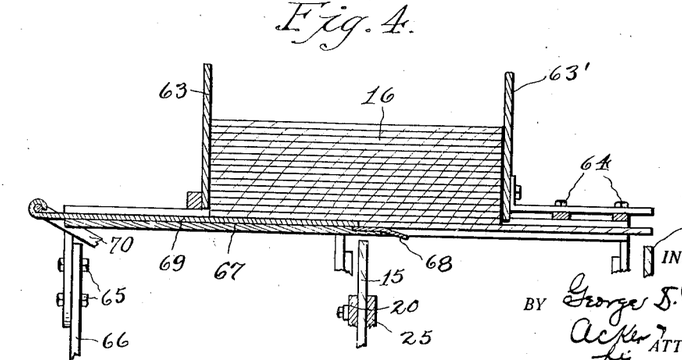
Fig. 4 is a fragmental longitudinal section of the bottom holding and feeding mechanism, taken in the direction of the arrows on the line 4—4 of Fig. 3.

The bottom shooks 16 are placed upon the positioned ends at the station A, Figs. 1 and 2 of the drawings, immediately after said ends have been positioned within their respective carriers by the mechanism described above. Said bottoms 16 are contained, in a stack, in a holder 63, Figs. 1, 2, 3 and 4, whose forward end 63', Fig. 4, is adjustably secured by means of clamp bolts 64, to accommodate bottoms of different length. Moreover, the entire holder is vertically adjustable, by means of clamp bolts 65, Figs. 3 and 4, by which it is secured to brackets 66 extending upwardly from the frame 2. The holder 63 is provided with a fixed bottom plate 67, which terminates, slightly forward of the center of the holder, in a downwardly bent lip 68, Fig. 4. Immediately above said bottom plate 67 is a horizontally reciprocable feed slide 69, Figs. 1, 2, 3 and 4, which is connected by links 70, Figs. 1, 2 and 4, with a lever 71, Fig. 1. Said lever is fulcrumed at 72, and carries a roller 73 adapted to follow a cam groove 74 formed in the carrier chain idler sprocket 61'. Thus as said sprocket rotates, the feed slide 69 is reciprocated beneath the holder 63.

When the feed slide 69 is moved rearwardly, the entire stack of bottoms 16 within the holder 63 drops down upon the bottom plate 67. Said feed slide then engages the rear end of the lowermost bottom shook of said stack, upon its forward movement, and pushes the same out beneath the forward end plate 63', as shown in Fig. 4 of the drawings. At the same time the box ends 15 and 15' positioned within their respective carriers, move forward, so that when said bottom 16 clears the lip 68, it falls in assembled position upon the ends 15 and 15', and, remaining thereon by its own weight, is carried along to the subsequent stations. The bottoms are thus placed upon the uppermost edges of the ends 15 and 15', the boxes being assembled in an inverted position.

The box sides 17, which are assembled with the ends and bottoms at the station B, Figs. 1 and 2 of the drawings, are initially positioned vertically in two stacks, resting upon oppositely disposed horizontal plates or tables 75, Figs. 1, 2, 5 and 6, one on each side of the carrier track 13. Fixed rear end guides 76, Figs. 1, 2 and 6 are secured to said tables 75, and adjustable forward end guides 77 are secured to said tables by clamp bolts 78, Fig. 6, passing through slots 79 in the base members of the guides 77, so that said guides may be moved toward or away from the rear guides 76 to accommodate box sides of different length.

The stacks of sides 17 are supported and held between lower and upper endless chains 80 and 80' respectively, Fig. 5, the lower chains 80 operating in slots 81 formed in the tables 75, as shown in Fig. 6. There are preferably two upper and two lower chains on each side, as shown. The chains 80 pass over sprockets 82 and 83, Fig. 5, fixed upon rotatable shafts 84 and 85, said shafts being common to both chains 80 on each side. The shafts 84 are the driving shafts and carry at their forward ends ratchet wheels 86 adapted to be engaged by pawls 87 (only one of which appears in Fig. 5) mounted upon lever arms 88 fulcrumed upon said shafts and adapted for oscillation thereabout. The lever arms 88 are connected by links 89 with a rocking beam 90, fulcrumed at its center, at 91, and connected by a link 92 with an eccentric 93 mounted upon the longitudinal shaft 46. The two ratchet wheels 86 and pawls 87 are so arranged that both are operated simultaneously, to turn the shafts 84 and move the chains 80, one ratchet working on the upstroke of the right-hand link 89 and the other upon the simultaneous down-stroke of the left-hand link 89.

The upper chains 80' are similarly mounted upon sprockets 82' and 83', fixed upon respective shafts 84' and 85', Fig. 5. The shafts 84' carry ratchets 86', adapted to be engaged by pawls 87' carried upon oscillatory lever arms 88', which in turn are connected by links 89' with the opposite ends of the rocking beam 90. Said upper ratchets and pawls are also so arranged that both are operated simultaneously with the lower ratchets and pawls, and in opposite directions thereto, so that the box sides 17 are fed inwardly by the simultaneous and intermittent movements of the chains 80 and 80'. The upper sprocket shafts 84' and 85' are carried in brackets 94, which are slotted, as shown at 95, and adjustably secured to the frame 2 by clamp bolts 96, so that said brackets, together with the upper chains 80', may be raised or lowered to accommodate box sides of different width. The upper ratchet operating links 89' are also adjustable, as to their length, as shown at 97.

The eccentric 93 is so timed upon the longitudinal shaft 46, that the box sides 17 are fed inwardly after the carriers, with the box ends and bottom, have come to rest at the position B of Figs. 1 and 2 of the drawings. Said sides 17 are fed inwardly sufficiently to bring the innermost sides into contact with the vertical edges of the box ends 15 and 15', and in this position said innermost sides are engaged by the pronged ends 24 and 24' of the adjustable spring carrier fingers 22 and 22', as shown in Figs. 2 and 8, and are thereby held in assembled position during the subsequent movement of the carriers, during which movement of the carriers the feed chains 80 and 80' remain stationary. In order to support the innermost box sides 17 after they leave the feed chains 80 and 80', and before they are engaged by the spring fingers 22 and 22', there are provided spring retaining members 98, Fig. 5, which engage the upper edges of said innermost sides and hold them firmly down upon the tables 75.

The assembled boxes are nailed at the station C of Figs. 1 and 2 of the drawings. The mechanism for accomplishing this may be of any suitable and well known form, and the details of its construction form no part of the present invention, except in so far as a nailing mechanism having certain possibilities of adjustment is required to complete the combination and form an integral part of an operative machine. For this reason the nailing mechanism is shown only in Fig. 1 of the drawings, and is therein only indicated in more or less conventional form, it being understood that such indication may be typical of any suitable nailing mechanism.

Said nailing mechanism is represented by hammers 99 and 100, the former for driving the nails in the bottom 16 of the box and the latter for nailing the sides 17. Hoppers and nail feed chutes 101 are indicated as being associated with the upper hammers 99, but these are omitted from the side hammers 100 for the sake of clearness, as is the operating and drive mechanism for all said hammers. The upper hammers 99 are carried by a horizontal member 102, and are secured thereto by adjustable connections 103, to enable them to be moved longitudinally of the machine for nailing boxes of different sizes. Similarly, the side nailing hammers 100 are carried by vertical members 104, which are secured, by adjustable connections 105, to a second horizontal member 106, so that said vertical members 104, with the side hammers 100, may be moved longitudinally of the machine. A similar construction, not shown in the drawings, may be employed for adjusting said side hammers 100 laterally to accommodate boxes of different width.

The entire nailing mechanism, including the horizontal members 102 and 106, is supported upon vertical posts 107, which rise from and are secured to the base 1. Therefore, by adjusting the height of the frame 2, by means of the adjustable supports 3 and 5, as previously described, the entire frame 2, with the carrier and assembling mechanism, may be brought into the proper vertical position with respect to the nailing mechanism, to enable the latter to properly function upon any size of box.

The finished boxes are removed from the carriers at the station D of Figs. 1 and 2 of the drawings and discharged from the machine. When the carriers come to rest at this station, the box sides 17 overlie the inwardly projecting end portions 108 of a pair of spaced longitudinally disposed arms 109, Figs. 2 and 7, one positioned on each side of the carrier track 13. Said arms are secured to a transverse shaft 110, suitably journaled at the extreme forward end of the frame 2, and one of said arms is extended forwardly from said shaft to form a lever 111, with which is connected a link 112, Fig. 7. Said link has a bifurcated lower end 113 adapted to straddle the drive shaft 48, and also carries a roller 114 adapted to ride in the groove 115 of a cam member 116 secured to said shaft 48. Thus, at the proper time, the rear ends of the arms 109 are elevated, to lift the box out of the carriers, and to place it in line with a discharge chute 117, as shown in dotted lines in Fig. 7. The box then slides down said chute, by gravity, to any suitable place of deposit not shown in the drawings. The inner vertical plate 25 of the rear carrier, and the outer vertical plate 20' of the forward carrier, being mounted upon the respective horizontal pivots 31 and 21', swing forwardly, as previously described, and as illustrated by the dotted lines in Fig. 7, to permit the box to be lifted therefrom by the swinging arms 109.

The operation of the machine will now be briefly described. Assuming that stacks of end shooks 15 and 15'—Figs. 1 and 2 of the drawings, are contained in their respective holders 33 and 33', bottom shooks 16 within the holder 63, and side shooks 17 positioned upon the tables 75, power is applied to the drive shaft 48. When the first pair of carriers reach the position A, the carrier chains 14 and 14' come to rest, and a pair of end shooks 15 and 15' are removed from their holders by the feed slides 37 and 37', and positioned in their respective carriers. Said carriers, with the ends held therein, then begin to move forward, and simultaneously therewith a bottom shook 16 is removed from its holder 63 by the feed slide 69, and deposited upon said ends.

When the carriers come to rest at the position B, a pair of side shooks 17 are assembled therewith by the movement of the feed chains 80 and 80', and are engaged by the spring fingers 22 and 22' of the carriers. This completes the assembling of the box, which is carried by the third step movement of the carriers to the position C, where the sides and bottom are nailed to the ends. The fourth and last step movement of the carriers carries the completed box to the position D, where it is lifted from said carriers by the swinging arms 109 and allowed to slide therefrom down the discharge chute 117.

In the meantime, at each successive movement of the carrier chains 14 and 14', a new pair of carriers has been brought to the position A, so that the described operations at each station are carried on simultaneously, and a completed box is discharged from the machine during each period of rest of said carrier chains.

In order to adjust the machine to make boxes of a different length, the sprocket 57', Fig. 8, is first adjusted relative to the sprocket 57 to bring the two carriers of each pair to the proper distance for the length of box to be made: The end holder 33', Figs. 1 and 2, is then set at the proper position to feed the forward ends 15' into their carriers, its operating lever 39' being set upon the shaft 41 at the same time. The forward plate 63', Fig. 4, of the bottom holder and the forward plates 77, Fig. 6, of the side holders are then adjusted to the length of their respective shooks, and the hammers of the nailing mechanism are properly set at the adjustments 103 and 105, Fig. 1.

To adjust the machine to make boxes of a different width, it is only necessary to change the positions of the spring fingers 22 and 22', Figs. 5 and 6, associated with the carriers, to enable their pronged ends 24 and 24' to engage the side shooks 17, and to properly adjust the side hammers 100, Fig. 1, of the nailing mechanism. For making boxes of a different depth, the bottom shook holder 63, Figs. 3 and 4, is set at the proper height by means of its adjusting screws 64; the brackets 94, Fig. 5, supporting the upper chains 80' of the side shook holders, are adjusted vertically at their clamp screws 96, the upper ratchet operating rods 89' being similarly adjusted at 97; and the entire frame 2 is set at the proper height, by means of the adjusting crank 12, Fig. 1, to enable the upper hammers 99 of the nailing mechanism to function properly. The machine is thus capable of adjustment to accommodate boxes varying in all three dimensions.

Having thus described my invention what I claim as new and desire to secure by Letters Patent is:—

1. In an apparatus for making boxes from shooks, holders for containing supplies of shooks, associated devices for successively removing shooks from said holders and assembling the same to form boxes, mechanism for nailing the assembled boxes, and an adjustable endless carrier for conveying the shooks as fed to the carrier and the boxes formed from said shooks from the assembling devices to the nailing mechanism.

2. In an apparatus for making boxes from shooks, devices for assembling the shooks to form a box, a pair of spaced carrier members adapted to engage the end shooks and to support said end shooks during the positioning of the side shooks in contact therewith, a conveyer, and means for adjustably securing said carrier members to said conveyer for moving the assembled shooks.

3. In an apparatus for making boxes from shooks, devices for assembling the shooks to form a box, a pair of spaced carrier members adapted to engage the end shooks and to convey the box away from the assembling devices, a pair of parallel conveyer members, one of said carrier members being secured to and impelled by each conveyer member, means for linearly adjusting one of said conveyer members relative to the other, and mechanism for operating said conveyer members simultaneously.

4. In an apparatus for making boxes from shooks, devices for assembling the shooks to form a box, a pair of spaced carrier members adapted to engage the end shooks and to convey the box away from the assembling devices, a pair of parallel endless conveyer chains, one of said carrier members being secured to and impelled by each conveyer chain, a pair of co-axial driving sprockets, one engaging each chain, means for adjusting one sprocket angularly with relation to the other, and mechanism for operating said sprockets simultaneously.

5. In an apparatus for making boxes from shooks, a pair of spaced movable carrier members, each comprising two vertically disposed parallel plates adapted to receive a box end therebetween means for positioning the box ends within said carriers, devices for positioning the bottom and side shooks in assembled relation with said ends, mechanism for nailing the assembled box and means for discharging the completed boxes.

6. In an apparatus for making boxes from shooks, a pair of spaced movable carrier members, each comprising two vertically disposed parallel plates adapted to receive a box end therebetween one plate of each pair being yieldably mounted, springs for pressing said yieldably mounted plates toward the other plates, means for positioning the box ends within said carriers, devices for positioning the bottom and side shooks in assembled relation with said ends, mechanism for nailing the assembled box, and means for discharging shooks from the carrier members.

7. In an apparatus for making boxes from shooks, a pair of spaced movable carrier members, each comprising two vertically disposed parallel plates adapted to receive a box end therebetween one plate of each pair being mounted for swinging movement away from the other plate, means for positioning the box ends within said carriers, devices for positioning the bottom and side shooks in assembled relation with said ends, mechanism for nailing the assembled box, and coordinated means for ejecting completed boxes from said carrier members.

8. In an apparatus for making boxes from shooks, a pair of spaced movable carrier members, each comprising two vertically disposed parallel plates adapted to receive a box end therebetween, means for adjusting the space between said carrier members, a pair of holders adapted to contain supplies of vertically positioned box ends, means associated with said holders for removing box ends therefrom and positioning the same within said carrier members, means for adjusting said holders to correspond with the space between said carrier members, and devices for positioning the bottom and side shooks in assembled relation with said ends.

9. In an apparatus for making boxes from shooks, a pair of spaced movable carrier members, each comprising two vertically disposed parallel plates adapted to receive a box end therebetween, means for adjusting the space between said carrier members, a pair of holders adapted to contain supplies of vertically positioned box ends, means associated with said holders for removing box ends therefrom and positioning the same within said carrier members, means for adjusting said holders to correspond with the space between said carrier members, a holder adapted to contain a supply of bottom shooks, means associated with the latter holder for removing a bottom shook therefrom and positioning the same in assembled relation upon said ends, and devices for positioning the side shooks in assembled relation with said ends and bottom.

10. In an apparatus for making boxes from shooks, a pair of spaced movable carrier members, each comprising two vertically disposed parallel plates adapted to receive a box end therebetween, means for adjusting the space between said carrier members, a pair of holders adapted to contain supplies of vertically positioned box ends, means associated with said holders for removing box ends therefrom and positioning the same within said carrier members, means for adjusting said holders to correspond with the space between said carrier members, a holder adapted to contain a supply of bottom shooks, means for adjusting the position thereof, means associated therewith for removing a bottom shook therefrom and positioning the same in assembled relation upon said ends, and devices for positioning the side shooks in assembled relation with said ends and bottom.

11. In an apparatus for making boxes from shooks, movable carrier members adapted to support the ends of a box in assembled relation, a pair of holders adapted to contain supplies of vertically disposed side shooks, one of said holders being positioned on each side of the path of travel of said carrier members, a pair of spaced upper and lower endless chains associated with each holder and adapted to hold the side shooks therebetween, means for operating said chains to force the shooks against the sides of the positioned ends, and devices associated with said carrier members for removing from said holders the side shooks held in contact with said ends.

12. In an apparatus for making boxes from shooks, movable carrier members adapted to support the ends of a box in assembled relation, a pair of holders adapted to contain supplies of vertically disposed side shooks, one of said holders being positioned on each side of the path of travel of said carrier members, a pair of spaced upper and lower endless chains associated with each holder and adapted to hold the side shooks therebetween, means for operating said chains to force the shooks against the sides of the positioned ends, means for adjusting the spaces between said upper and lower chains to accommodate side shooks of different widths, and devices associated with said carrier members for removing from said holders the side shooks held in contact with said ends.

13. In an apparatus for making boxes from shooks, a pair of adjustable carrier members, mechanism for causing said carrier members to progress, in a series of step movements, through a series of successive stations, said carrier members having a period of rest at each station, means for assembling the end and bottom shooks of a box upon said carrier members at the first station, means for assembling the side shooks therewith at the second station, mechanism for nailing the assembled box at the third station, and means for removing the finished box from said carrier members.

14. In an apparatus for making boxes from shooks, a pair of adjustable carrier members, mechanism for causing said carrier members to progress, in a series of step movements, through a series of successive stations, said carrier members having a period of rest at each station, holders adapted to contain end and bottom shooks positioned at the first station, means associated therewith for removing ends and a bottom therefrom and assembling the same upon said carrier members, holders adapted to contain side shooks positioned at the second station, means associated therewith for removing sides therefrom and assembling the same with said ends and bottom, mechanism for nailing the assembled box at the third station, and means for removing the finished box from said carrier members.

15. In an apparatus for making boxes from shooks, a plurality of pairs of adjustable carrier members, mechanism for causing said carrier members to progress, in a series of step movements, through a series of successive stations, each pair of carrier members having a period of rest at each station, holders adapted to contain supplies of end and bottom shooks positioned at the first station, means associated therewith for successively removing ends and bottom therefrom and assembling the same upon successive pairs of carrier members, holders adapted to contain supplies of side shooks positioned at the second station, means associated therewith for successively removing sides therefrom and assembling the same successively with said ends and bottoms, mechanism for successively nailing the assembled boxes at the third station, and means for removing finished boxes from said carrier.

16. In an apparatus for making boxes from shooks, a plurality of pairs of adjustable carrier members, mechanism for causing said carrier members to progress, in a series of step movements, through a series of successive stations, each pair of carrier members having a period of rest at each station, holders adapted to contain supplies of end and bottom shooks positioned at the first station, means associated therewith for successively removing ends and bottoms therefrom and assembling the same upon successive pairs of carrier members, holders adapted to contain supplies of side shooks positioned at the second station, means associated therewith for successively removing sides therefrom and assembling the same successively with said ends and bottoms, mechanism for successively nailing the assembled boxes at the third station, means for removing the finished boxes from the carriers, and devices for adjusting said holders, said assembling means, and said nailing mechanism to accommodate boxes of various sizes.

17. In an apparatus for making boxes, the combination with a movable conveyor, of shook holders disposed at different points along the path of the conveyor, a track passing over said conveyor, means carried by the track for receiving the end shooks and supporting the same, means for feeding the side shooks into engagement with said end shooks, and coordinated means for nailing said shooks together, said means for feeding the side shooks comprising upper and lower endless members cooperating with the shooks and adapted upon actuation to move the front shooks into engagement with the side shooks carried by the tracks.

18. An apparatus for making boxes, comprising endless conveyors, holders adjacent the path of said conveyors adapted to receive and store end and side shooks, devices on said conveyors for receiving and holding the end shooks, means for feeding the side shooks into engagement with the end shooks, and mechanism for nailing said shooks, said means for feeding the side shooks comprising upper and lower continuous chains cooperating with the edges of the shooks for feeding the foremost side shooks into engagement with the end shooks.

19. In an apparatus for making boxes from shooks, the combination with a movable carrier adapted to support the ends of a box, an endless conveyor for said carrier, a pair of holders adapted to contain supplies of vertically disposed side shooks, one of said holders being positioned on each side of the path of travel of the carrier members, means for feeding said side shooks comprising upper and lower endless chains associated with the holder adapted to successively move the side shooks into operative relation with the carrier, and means for feeding end and bottom shooks to said carrier plate to contact with the side shooks.

20. In an apparatus for making boxes from shooks, the combination with a movable carrier adapted to support the ends of a box, an endless conveyor for said carrier, a pair of holders adapted to contain supplies of vertically disposed side shooks, one of said holders being positioned on each side of the path of travel of the carrier members, means for feeding said side shooks comprising upper and lower endless chains associated with the holder adapted to successively move the side shooks into operative relation with the carrier, means for feeding end and bottom shooks to said carrier plate to contact with the side shooks, means for nailing said shooks together at a different point during the travel of the conveyor, and automatically acting means for discharging an assembled and nailed box from the conveyor.

In testimony whereof I have signed my name to this specification.

GEORGE D. PARKER.